United States Patent
Huang et al.

(10) Patent No.: US 6,833,123 B2
(45) Date of Patent: Dec. 21, 2004

(54) METHOD FOR LIQUID CHROMATE ION AND OXY-METAL IONS REMOVAL AND STABILIZATION

(75) Inventors: Ching-Tsuen Huang, Tao Yuan (TW); Tzeng-Ming Liu, Chung Li (TW); Tsye-Shing Lee, Tao Yuan (TW); Wen-Chao Lai, Tao Yuan (TW)

(73) Assignee: Institute of Nuclear Energy Research, Tao Yuan (TW)

( * ) Notice: Subject to any disclaimer, the term of this patent is extended or adjusted under 35 U.S.C. 154(b) by 0 days.

(21) Appl. No.: 09/734,730

(22) Filed: Dec. 13, 2000

(65) Prior Publication Data

US 2002/0044908 A1 Apr. 18, 2002

(30) Foreign Application Priority Data

Aug. 10, 2000 (TW) ........................ 89116060 A

(51) Int. Cl.⁷ .................... C01G 37/00; C01G 39/00; C01G 31/00; C01G 41/00; C04B 18/00
(52) U.S. Cl. .................... 423/55; 423/65; 210/670; 210/673; 210/683; 210/684; 210/688; 210/912; 210/913; 588/252; 588/256; 588/257
(58) Field of Search .................. 423/55, 65, 596, 423/593.1, 594.13, 594.8, 594.16; 210/670, 673, 683, 684, 688, 912, 913; 588/252, 256, 257; 502/407

(56) References Cited

U.S. PATENT DOCUMENTS

| | | | | |
|---|---|---|---|---|
| 3,427,236 A | * | 2/1969 | Scholander et al. | |
| 3,607,482 A | * | 9/1971 | Selm | |
| 3,616,344 A | | 10/1971 | Peterson | |
| 3,869,386 A | * | 3/1975 | Izdebski | |
| 4,054,517 A | * | 10/1977 | Feltz et al. | |
| 4,086,150 A | | 4/1978 | Kindl et al. | |
| 4,376,099 A | * | 3/1983 | Yamamoto et al. | 423/54 |
| 4,401,631 A | * | 8/1983 | Canavesi et al. | 423/54 |
| 4,481,087 A | | 11/1984 | DiGiacomo | |
| 4,481,090 A | * | 11/1984 | Childs | |
| 4,525,483 A | | 6/1985 | Grier et al. | |
| 4,572,739 A | | 2/1986 | Rasmussen | |
| 5,098,579 A | * | 3/1992 | Leigh et al. | |
| 5,211,853 A | | 5/1993 | Jackson et al. | |
| 5,302,290 A | | 4/1994 | Tucker et al. | |
| 5,326,439 A | | 7/1994 | Brewster | |
| 5,456,840 A | | 10/1995 | Tucker et al. | |

FOREIGN PATENT DOCUMENTS

| | | |
|---|---|---|
| CA | 1119772 | 3/1982 |
| CA | 1139080 | 1/1983 |
| JP | 55-142589 | * 11/1980 |
| TW | 6211803 | 10/1975 |
| TW | 78102127 | 3/1990 |
| TW | 77106237 | 7/1991 |
| TW | 84112122 | 5/1997 |

* cited by examiner

Primary Examiner—Steven Bos
(74) Attorney, Agent, or Firm—Burns, Doane, Swecker & Mathis, L.L.P.

(57) ABSTRACT

A method for removing at least one of chromate and other oxy-metal ions from liquid solutions includes contacting the liquid solution with solid barium compounds as adsorbents so that the at least one of chromate and other oxy-metal ions in liquid solution are subject to an exchange reaction with the anion of solid barium compounds to produce products including at least one of solid barium chromate and oxy-metal barium compounds and are removed from the liquid solution by a liquid-solid separation operation. A method for stabilizing at least one of chromate and other oxy-metal ions that are present in liquid or sludge wastes includes mixing the liquid or sludge wastes with barium compounds in solid form, so that the at least one of chromate and oxy-metal ions are immobilized in a solidified body after curing of the mixture.

10 Claims, No Drawings

METHOD FOR LIQUID CHROMATE ION AND OXY-METAL IONS REMOVAL AND STABILIZATION

BACKGROUND OF THE INVENTION

This invention relates to the removal and stabilization of chromate ions and other oxy-metal ions from liquid solution. Particularly, this invention relates to a method that makes use of barium compounds to remove chromate ions and other oxy-metal ions from liquid solutions.

For purposes of environmental protection, chromate ions are considered as very serious oxy-metal ions. Because of high toxicity, chromate ions can cause cancer or induce cell mutation in human as well as animal bodies. Chromate salts are widely used in electroplating, dye-works, chemical fertilizer production, petrochemical industry, tannery, textile industry, paper-mill, steel-works, and more. Therefore, research on the treatment and recycling of underground water, household waste water, or industrial liquid wastes containing chromate ions has received much attention all over the world. Presently, accepted methods for treating such liquid wastes involve methods such as: adsorption, reduction-precipitation, ion-exchange, solvent extraction, diaphragm electrolysis, inverse dialysis, etc.

U.S. Pat. No. 4,481,087 discloses an adsorption method, in which hydrous ferrous oxide (FeO(OH)) is used in processing to form a powdery, porous black material with high surface area, as adsorbent, whereby it adsorbs chromate ions or dichromate ions ($Cr_2O_7^{-2}$ and $HCr_2O_7^-$). The method is far from satisfactory, in that one gram of the absorbent can at most absorb only 25 mg of hexavalent chromium ion $Cr^{+6}$).

In U.S. Pat. Nos. 5,302,290 and No. 5,456,840, a complex salt agent, poly-di-methyl di-allyl ammonium chloride (i.e. PDMDAAC), is employed to react with the soluble $Cr^{+6}$ in an aqueous solution, thus forming a chromic complex. This aqueous solution is then made to pass through an ultra-filter. The concentrated chromic complex mud gathered after the filtration process is mixed with barium chloride ($BaCl_2$) or lead chloride ($PbCl_2$) to form the almost insoluble barium chromate ($BaCrO_4$) or lead chromate ($PbCrO_4$) precipitates; meanwhile, complex cations react with chlorine ions, turning into the original complex salt agent which is perfectly suitable for reuse. By applying this reduction-precipitation method to underground water purification, chromate ions' concentration can be reduced down to 42 ppm or below. However, because ultra-filtration is a time-consuming process, this method is of but very limited use.

U.S. Pat. No. 4,525,483 gives an example of ion-exchange resin technique, in which chlorine ion-exchange resin and hydrogen ion-exchange resin are mixed into a resin bed to remove $CrO_4^{-2}$ from the spent coolant discharged from a water cooling system, or from the sodium chloride solution used in an electrolysis process for the making of sodium chlorate ($NaClO_3$). The method is still not exactly satisfactory, in that 1 mg of chlorine ion-exchange resin can absorb only about 0.01 g of $CrO_4^{-2}$.

A method for stabilizing chromate ions within cement is disclosed in U.S. Pat. No. 4,572,739, where hydrated ferrous sulfate salt, $FeSO_4.7H_2O$, or ferrous sulfide, FeS, is mixed into cementing materials in the process of cement production, so as to reduce the solubility of the soluble chromate salts within said mixture. However, in practice, it was quickly found that, thanks to the high moisture and high temperature conditions inside the cement pulverizer, chromate salts were partially dissolved, which trickled down and left traces on the conveying belts, causing skin irritation and other more serious health problems among the cement workers. So this chromate-ion stabilization method fails to attain its goal.

U.S. Pat. No. 5,211,853 discloses a reduction-precipitation method using hydroxyl amine, $NH_3.OH$, or hydroxyl amine sulfate, $(NH_2OH)_2.H_2SO_4$ (i.e. HAS), for reduction agent. At controlled pH and temperature, said reduction agent reacts with potassium dichromate ($K_2Cr_2O_7$) that has been used in the production of sodium chlorate, resulting in divalent and/or trivalent chromic hydroxide precipitates. After filtering out such chromate salts, residual $Cr^{+6}$ concentration in the filtrate is found to be between 2 and 10 ppm.

U.S. Pat. No. 5,326,439 makes use of Andco electrolytic method to remove such soluble toxic elements as chromium (Cr), arsenic (As) and lead (Pb) from underground water. According to this disclosure, ferrous ions are formed at the iron-alloy anodes under suitable conditions, while in the electrolyte $Cr^{+6}$ is reduced to $Cr^{+3}$, and at the same time the barely soluble chromium trioxide ($CrO_3$) precipitates are coming out. Thereafter, the precipitates are separated from the water by means of filtration. This is doubtless a very effective method for small-scale water purification, as residual $Cr^{+6}$ concentration of such treated water is lower than 0.05 ppm.

Canadian Patents No. 1, 119, 772 and No. 1, 139, 080 disclose a reduction-precipitation method to reduce $Cr^{+6}$ to $Cr^{+2}$ and $Cr^{+3}$, where hydroxylamine ($NH_3OH$) or hydrazine ($NH_2.NH_2$) is the reduction agent which reacts with dichromate salts present in a chlorate solution, resulting in a blue-green hydrated chromium oxide precipitate ($Cr_3O_4.xH_2O$). A distinct drawback of this method is that such reduction agents are as toxic as they are expensive.

Still one more reduction-precipitation method is found in U.S. Pat. No. 3,616,344, where sodium sulphite $Na_2SO_3$), or ammonium sulphite (($NH_4)_2SO_3$), or tin diethyl-oxide ($Sn(C_2H_5)_2O$), being the $Cr^{+6}$ reduction agent of choice, is added into a chlorate solution, causing the precipitation of a trivalent chromium hydroxide. The precipitates are then separated from the solution by means of filtration or centrifugation. Furthermore, the patent discloses that the addition of soluble metal salts (e.g. zinc, cobalt, lead and copper salts) into chromate ions' solution can cause the formation of insoluble chromate salts (e.g. $PbCrO_4$) which are subsequently filtered out, resulting in the removal of chromate ions.

A similar reduction-precipitation method for removing chromate salts from sodium chlorate solution is disclosed in U.S. Pat. No. 4,086,150, where soluble sulphides and then ferrous salts are added into the solution to convert chromate ions into trivalent chromium compounds which afterwards are filtered out.

In Taiwan Patent Application No. 6211803 a unique approach to chromate ions' removal and recycling is made public. Here a pipe is filled up with porous leech stones which are spread over with almost insoluble lead compounds such as lead hydroxide ($Pb(OH)_2$) and lead carbonate ($PbCO_3$). Then the two ends of the pipe are sealed off with cotton fibers. By putting through the pipe a waste water known to be containing chromate ions, chromate ions react with aforesaid lead compounds, resulting in insoluble lead chromate ($PbCr_4$). Since by this method some lead ions are present in the treated water, the water is conducted to pass through a cation-exchange resin to absorb and detain the lead ions. And finally, the lead chromate is retrieved from the pipe for use in painting.

Taiwan Patent Application No. 77106237 discloses a method to remove $Cr^{+6}$ from a chlorate-salt aqueous solution which contains chlorite ions and dichromate ions. Said chlorate salts solution is obtained from electrolytic salt water. At pH 10.0 and temperature 80° C., chlorine water and alkaline buffers are added into the solution, converting dichromate ions into divalent or trivalent chromium compounds which gradually become precipitates of a blue-green color. Thereafter, said precipitates are removed from the solution by means of filtration.

Taiwan Patent Application No. 78102127 discloses a solvent-extraction method for removing heavy metal ions anions or cations of chromium, nickel, lead and copper, from waste water, where organic phosphinic acid, or 2,2-diethyl hexethyl phosphoric acid (D2EBPA), or one of aliphatic ammonium group is employed as extraction agent to react with heavy metal ions, resulting in precipitates of complex compounds which are subsequently separated from the purified water. Then, according to the chemical characteristics of those heavy-metal complex compounds, a suitable quantity of ore acid or ammonium hydroxide ($NH_4OH$) is added to reclaim the extraction agent.

Taiwan Patent Application No. 84112122 discloses a dry distillation method for the recycling of chromate salts from an electrolytic mud. Without adding water to the mud nor increasing its temperature, suitable measure of acidity agent or strong oxidization agent is mixed into the mud, thus either driving out trivalent chromium ions from the mud or converting them into $Cr^{+6}$. These chromium ions are then separated from the mud in the form of chromate salts, which are useful in several industries.

In Taiwan, some studies relevant to the present invention show that some attempts have been made to use moss peat, fly ash, activated carbon, carbonized paddy, delayed leaf veins and hematite as adsorbent materials. But for their low adsorption capacities, these instances are interesting because they can reduce cost in processing or recycling. In such cases the adsorption mechanism relies on the fact that various particles of oxides of iron, aluminum, and silicon, etc., being the basic components of red iron ore, fly ash, or moss peat, once present in aqueous solution become positively or negatively charged on their surfaces, thus some repel and others attract chromate ions, and, as a result, chromate ions are absorbed by some of these oxides. Moreover, the inventors have tried activated carbon, carbonized husks and humus, and have found them all capable of absorbing chromate ions. One gram of activated carbon can absorb $Cr^{+6}$ up to 123 mg or more; but then activated carbon is rather expensive.

The foregoing general survey of the available chromate ions' removal or stabilization methods indicates that each method has one or more of the following drawbacks, namely: high energy cost, high material cost, dangerous chemicals, expensive equipment, complicate procedures, long operation time, low absorption capacity, difficult to recycle, etc. At present, only ion-exchange resin method is widely used in handling industrial liquid waste containing chromate ions.

SUMMARY OF THE INVENTION

In view of the drawbacks of the prior arts as above briefly described, the inventors herein disclose an effective adsorption method for removing as well as stabilizing chromate ions and/or other oxy-metals ions. The inventors have discovered that low-acidity barium salts are potent absorbents with respect to chromate ions and other oxy-metal ions, and their adsorption efficiencies are greater than all the adsorption agents mentioned in the foregoing survey. For example, one gram of barium silicate as an adsorption agent adsorbs more than 200 mg of saturated hexavalent chromium ions, far greater than all the known adsorbents for such case. Moreover, it may be well to note that the adsorption agent of the invention with respect to the adsorption of chromate ions is an anion-exchange reaction. When barium silicate undergoes an adsorption process, it represents an exchange reaction of silicate ions with chromate ions as follows:

$$CrO_4^{2-}+BaSiO_2(OH)_2=BaCrO_4+SiO_2(OH)_2^{2-} \quad (1)$$

The adsorption reactions with barium carbonate and barium fluosilicate are respectively as follows:

$$CrO_4^{2-}+BaCO_3=BaCrO_4+CO_3^{2-} \quad (2)$$

$$CrO_4^{2-}+BaSiF_6=BaCrO_4+SiF_6^{2-} \quad (3)$$

All three produce barium chromate ($BaCrO_4$) whose solubility is extremely low; consequently, with this kind of absorption treatment the residual concentration of $Cr^{+6}$ within the final solution is also extremely low—usually lower than 0.01 ppm with barium silicate as absorbent, for instance. And it is also shown in the above formula that in the aqueous solution chromate ions are replaced by silicate ions, carbonate ions, or silicon hexaflourite ions. When the original chromate compound is sodium chromate ($Na_2CrO_4$), the above three absorption reactions can produce sodium silicate ($Na_2SiO_2(OH)_2$), sodium carbonate ($Na_2CO_3$) and sodium silicon hexafluoride ($Na_2SiF_6$) respectively, all of which are of higher alkalinity than sodium chromate which they replace, hence, after such a reaction, the solution's pH value will be higher than before.

Experimental results reveal that a solution's pH can greatly affect absorption efficiency. The inventors have discovered that, barium silicate, as a potent $Cr^{+6}$ absorbent, can maintain its high absorption efficiency fairly unchanged in the solutions of pH values ranging from 6 to 10. The invention, therefore, is applicable to a wide range of aqueous solutions containing chromate ions and/or other oxy-metal ions; even in the case that the absorption reaction increases the solution's pH, the invention is usually still very effective.

High adsorption efficiency is probably the most notable merit of the present invention. Another thing worthy of note is that the above chemical formulas are reversible reactions;

that is, in one direction (to the right) they are chromate ions' adsorption reactions, whereas in the opposite direction (to the left) they are desorptions of chromate ions from solid-phase absorbents back into the solutions. So another advantage of the invention is that the absorbents having been used can be regenerated for reuse, and this significantly lower the cost of liquid waste treatment. Moreover, after such a desorption process, the de-sorbed chromate ions can be gathered for use. The inventors have discovered that 0.5N sodium carbonate is quite an effective chromate-ion de-sorption solution; the higher the solution's concentration the better the desorption result. Desorption efficiency, of course, has to do with the pH value of the solution. It is found that, when the desorption solution's pH value is smaller than 8, sodium carbonate solution's desorption efficiency is less than remarkable; however, from pH 9 to pH 10 desorption efficiency increases quickly, reaching its optimum efficiency once above pH 10.

Additionally, still referring to the removal of chromate ions, the invention uses high-water solubility barium compounds such as barium chloride, barium hydroxide, etc., to prepare a water solution, which is then mixed with a liquid waste containing chromate ions and/or other oxy-metal ions. This induces the precipitation of insoluble barium-salts, and subsequently the precipitates are filtered out.

Still another application of the invention is to add water soluble barium compound powders or their aqueous solutions into solidification agents containing wastes of chromate ions or containing wastes of other oxy-metal ions, so that insolubility barium compounds are similarly formed by chromate ion and other oxy-metal ions thereby achieving stabilization of chromate ion and/or other oxy-metal ions. This stabilization method can notably decrease chromate and/or other oxy-metal ions' TCLP dissolving rates, and increase the quality of waste solidified bodies containing chromate ions or containing other oxy-metal ions and the waste loading capacity of solidified bodies.

Besides chromate ions, the method of this invention, as detailed in the foregoing, is effective with respect to other oxyetal ions including oxy-molybdenum, oxy-wolfram, and oxy-vanadium ions, etc.

In the following, some laboratory examples are presented to further illustrate the method and advantages of the present disclosure. These embodiments of the invention, including their sample compositions, experimental procedures, operation conditions, testing methods and results, etc., only partly indicate the application range of the invention: they do not represent the full scope of the same and can not be regarded as limits to the same.

DETAILED DESCRIPTION OF THE EXAMPLES OF THE INVENTION

EXAMPLE 1

Six kinds of chromate-ion aqueous solutions in different concentrations were prepared by dissolving sodium chromate in six cone-shaped glass bottles with de-ionized water, of which all were of net weight 45 g, whose $Cr^{+6}$ contents were 10 mg, 25 mg, 50 mg, 75 mg, 100 mg, and 105 mg respectively. Into each of these sample solutions was added 0.5 g of barium silicate powder for absorbent. Then the six bottles were kept at 30° C. in a constant-temperature trough, and each sample solution was agitated by means of an electric magnet. Next, 3.0N hydro-chlorine acid or 3.0N sodium hydroxide aqueous solution is used to adjust the pH value of each sample solution, adding a few drops once in every twenty minutes, until the pH became stable at 2.0. De-ionized water was then added into each bottle until the net weight of each sample solution became 50 g, so that the $Cr^{+6}$ concentrations of the six sample solutions were 200 ppm, 500 ppm, 1000 ppm, 1500 ppm, 2000 ppm, and 2100 ppm. These bottles were sealed off and agitation was continued, until 48 hours later the seals were removed and the pH value of each sample solution was measured once again to make sure it stayed at 2.0. Then the spent adsorbent within each sample solution was filtered out, and each filtrate was analyzed by UV spectrophotometer to determine its residual $Cr^{+6}$ concentration, the color-revealing agent in use being diphenyl carbazide ($C_6H_5.NH.NH.CO.NH.NH.C_6H_5$). The above procedures were repeated several times at different pH values of the sample solutions. Results of this absorption experiment are given in Table 1, where the residual $Cr^{+6}$ concentrations at pH values 2.0, 4.0, 6.0, 8.0, and 10.0 are listed in reference to six initial $Cr^{+6}$ concentrations. The results prove that when the solution's pH value is between 6.0 and 10.0; and so long as the initial $Cr^{+6}$ concentration is not much greater than 1500 ppm, barium silicate powder is an excellent adsorbent, because all the residual $Cr^{+6}$ concentrations within this fairly wide range of pH are less than 0.05 ppm. It may be well to mention that, by Taiwan EPA regulations on waste-water discharge, the tolerance limit of hexavalent chromium ion ($Cr^{+6}$) concentration is 0.5 ppm; so, evidently, the present invention is very effective in this kind of use.

TABLE 1

Analytical data from the adsorption experiments on waste water containing chromium (VI)

| initial concentration of chromium (VI) solution (ppm) | residual chromium (VI) concentration in the solution (ppm) | | | | |
|---|---|---|---|---|---|
| | pH 2.0 | pH 4.0 | pH 6.0 | pH 8.0 | pH 10.0 |
| 200 | 33.860 | 0.2651 | 0.0241 | 0.0233 | 0.0181 |
| 500 | 44.770 | 0.3254 | 0.0241 | 0.0201 | 0.0181 |
| 1000 | 68.080 | 0.4941 | 0.0321 | 0.0361 | 0.0332 |
| 1500 | — | 0.8496 | 0.0343 | 0.0422 | 0.0321 |
| 2000 | 291.14 | 6.8446 | 0.1165 | 2.9300 | 16.630 |
| 2100 | 407.30 | 26.510 | 31.930 | 120.02 | 118.34 |

EXAMPLE 2

Example 2 is similar to the Example 1 in sample solution preparation and in accord with it in experimental procedures and analysis method, but instead of barium silicate powder, this example shows the effectiveness of de-watered barium carbonate powder and barium fluosilicate powder as adsorbents. 90 g of solution containing 60 mg of hexavalent chromium ions were used. As pH was adjusted, soon after the pH of the sample solution turned stable and became the targeted value, de-ionized water was added until the solution became 100 g. Results of this example, shown in Table 2, prove that de-watered barium carbonate powder and barium silicon hexafluoride powder are excellent $Cr^{+6}$ absorbents at solution's pH value between 6.0 and 8.0.

TABLE 2

Result of barium carbonate and barium fluosilicate adsorbing hexavalent chromium

| adsorbent | residual concentration of $Cr^{+6}$ in the solution (ppm) | | | | | |
|---|---|---|---|---|---|---|
| | pH 2.0 | pH 4.0 | pH 6.0 | pH 8.0 | pH 10.0 | pH 12.0 |
| $BaCO_3$ | 81.51 | 0.498 | 0.061 | 0.170 | 17.78 | 65.10 |
| $BaSiF_6$ | 454.0 | 32.80 | 0.146 | 0.036 | 0.219 | 0.413 |

EXAMPLE 3

The adsorption experiment of Example 1 was carried out and the spent adsorbent, now a wet substance, was collected after filtration. This wet substance was then subject to washing with de-ionized water, and subsequently was slowly de-watered in an oven until it became dry powder. By chemical analysis it was found that one gram of this dry powder comprised 151.4 mg of $Cr^{+6}$. Then, three cone-shaped glass bottles were washed and dried, and into each bottle was put 0.4 g of the prepared powder, then, in one bottle was added 100 ml of 1.0N sodium carbonate aqueous solution, in another, 100 ml of 1.0N sodium sulphite aqueous solution, and in the other, 100 ml of 1.0N hydro-chlorine acid. These three bottles were then sealed off, kept at 30° C. in a constant-temperature trough, and agitated until 16 hours later, the seals were removed and the precipitates within each sample solution filtered out. Then the residual $Cr^{+6}$ concentration of each filtrate was measured. Results are listed in Table 3, where it is shown that sodium carbonate and hydro-chlorine acid are excellent $Cr^{+6}$ de-sorption agents.

TABLE 3

Comparison of desorption effeciencies in different desorbents

| desorption solution (1.0 N) | $Cr^{+6}$ concentration in in desorption solution (mg/L) | $Cr^{+6}$ desorption rate (%) |
|---|---|---|
| $Na_2CO_3$ | 596.5 | 98.67 |
| $Na_2SO_3$ | 395.0 | 65.34 |
| HCl | 591.6 | 97.86 |

EXAMPLE 4

A certain amount of spent $Cr^{+6}$ adsorbent with $Cr^{+6}$ content 151.14 mg/g was dissolved by 100 ml 1.0N sodium carbonate aqueous solution in a cone-shaped glass bottle. The same de-sorption experiment as Example 3 was carried out with this sample solution; afterwards, the $Cr^{+6}$ content of the regenerated adsorbent was measured and de-sorption efficiency calculated. The experiment was conducted several times with different initial amount of the spent adsorbent and with either 1.0N or 2.0N sodium carbonate aqueous solution. Results are listed in Tables 4.1 and 4.2. This example proves once again that sodium carbonate is a powerful $Cr^{+6}$ de-sorption agent; moreover, it proves that it is possible to restore the spent absorbent to its original absorption capacity by such de-sorption treatment.

TABLE 4

Result of desorption with sodium carbonate solution chromium containing adsorbent

| initial weight (g) | $Cr^{+6}$ content before desorption (mg) | $Cr^{+6}$ content after desorption (mg) | desorption rate (%) |
|---|---|---|---|
| 1.0 N sodium carbonate desorption solution | | | |
| 0.2002 | 30.258 | 0.158 | 99.48 |
| 0.4002 | 60.486 | 0.386 | 99.36 |
| 0.6001 | 90.699 | 3.999 | 95.59 |
| 1.002 | 151.17 | 70.770 | 52.87 |
| 1.2001 | 181.38 | 112.380 | 38.04 |
| 2.0 N sodium carbonate de-sorption solution | | | |
| 0.2002 | 30.258 | 0.0082 | 99.97 |
| 0.4002 | 60.486 | 0.4862 | 99.20 |
| 0.6001 | 90.699 | 1.0642 | 98.83 |
| 1.002 | 151.17 | 11.670 | 92.28 |
| 1.2001 | 181.38 | 21.880 | 87.94 |

EXAMPLE 5

Barium silicate adsorbent already adsorbed with chromate ions was used to desorb the chromate ions with 1N sodium carbonate solution in accordance with the method of Example 3. The desorbed solids were filtered and gathered, and after washing with water and drying in an oven a regenerated adsorption agent of mainly barium carbonate in chemical composition was obtained. Next, 0.5 g of this regenerated absorbent powder was placed in a cone-shaped glass bottle, and was dissolved by 90 g sodium chromate aqueous solution with 60 mg $Cr^{+6}$ content. Adsorption experiment following the steps of Example 1 was carried out with this sample solution at 30° C. The experiment was repeated several times at various pH values. As pH was adjusted, once the pH of the sample solution turned stable and became the targeted value, de-ionized water was added until the solution became 100 g. Results of this example, shown in Table 5, prove that regenerated barium carbonate powder is still a potent $Cr^{+6}$ absorbent at solution's pH between 6.0 and 8.0.

TABLE 5

Result of adsorption experiment on adsorption agents after regeneration residual $Cr^{+6}$ concentration in solution (ppm)

| pH 2.0 | pH 4.0 | pH 6.0 | pH 8.0 | pH 10.0 | pH 12.0 |
|---|---|---|---|---|---|
| 78.48 | 1.008 | 0.3037 | 0.2065 | 15.69 | 49.08 |

EXAMPLE 6

Six parts of 0.50 g barium chloride ($BaCl_2 \cdot 2H_2O$) were weighed and placed respectively in six cone-shaped glass bottles and into each of which was added 90 g sodium chromate solution, in which 60 mg hexavalent chromium ions were contained. These glass bottles were then kept in a constant-temperature trough at 30° C., and the sample solutions were agitated. Then 3.0N hydrochloric acid or 3.0N sodium hydroxide were used to adjust the pH value of each sample solution, for every twenty minutes, until the pH values of the six sample solutions were 2.0, 4.0, 6.0, 8.0, 10.0, and 12.0 respectively. When the change in pH value became stable, de-ionized water was then added into each glass bottle until each sample solution became 100 g. The glass bottles were then sealed off and agitation was continued; until 4 hours later, the seals were removed and the pH value of each sample solution was measured once again to make sure it did not change. Then the spent adsorbent within each sample solution was filtered out, and each filtrate was analyzed by UV spectrophotometer as already related in Example 1. The foregoing experimental procedures were repeated with $Ba(OH)_2 \cdot 8H_2O$ in place of $BaCl_2 \cdot 2H_2O$. Results are listed in Table 6, where it is shown that when the solution's pH is above 6.0, hydrated barium chloride and hydrated barium hydroxide are excellent $Cr^{+6}$ absorption agents.

TABLE 6

Result of chromium (VI) desorption treatment experiment in solution containing chromium (VI)

| adsorption agent | residual $Cr^{+6}$ concentration (ppm) | | | | | |
|---|---|---|---|---|---|---|
| | pH 2.0 | pH 4.0 | pH 6.0 | pH 8.0 | pH 10.0 | pH 12.0 |
| $BaCl_2 \cdot 2H_2O$ | 91.1 | 0.68 | 0.0 | 0.0 | 0.0 | 0.0 |
| $Ba(OH)_2 \cdot 8H_2O$ | 137.3 | 1.02 | 0.024 | 0.048 | 0.048 | 0.048 |

EXAMPLE 7

Two parts of 0.59 g barium silicate ($BaSiO_3 \cdot H_2O$) were weighed and placed respectively in two conical glass bottles. Then in one bottle was added 90 g sodium wolframate solution containing 60 mg $W^{+6}$, and in the other was added 90 g sodium molybdate solution containing 60 mg $Mo^{+6}$. An experiment was conducted, similar to Example 1. The two glass bottles were kept at 30° C. in a constant-temperature trough, and each sample solution was agitated by an electric magnet; meanwhile 3.0N hydro-chlorine acid or 3.0N sodium hydroxide aqueous solution was used to adjust the pH value of each sample solution, adding few drops once in every twenty minutes, until the pH became stable at 8.0. De-ionized water was then added into each bottle until each sample solution became 100 g. Then the glass bottles were sealed off and agitation, was continued; until 4 hours later, the seals were removed and the pH value of each sample solution was measured once again to make sure it did not change. Then the spent adsorbent within each sample solution was filtered out, and each filtrate was analyzed by UV spectrophotometer to determine the residual concentration of $W^{+6}$ or $Mo^{+6}$. As shown in Table 7, barium silicate is an effective adsorption agent with respect to wolframate and molybdate radicals.

TABLE 7

Result of experiment on adsorption of wolframate radicals And molybdate radicals in water solution

| | $W^{+6}$ concentration (ppm) | $Mo^{+6}$ concentration (ppm) |
|---|---|---|
| Before adsorption | 600 | 600 |
| After adsorption | 1.51 | 1.24 |

EXAMPLE 8

A solution of hexavalent chromium ions having a concentration of 7000 ppm was prepared with sodium chromate. This sample solution was then mixed by stirring with Portland type II cement into a slurry, and, while mixing, barium compounds of different weights like barium silicate, barium hydroxide, etc., were added into the slurry to serve as a stabilizing ingredient for the chromate ions. Once fully mixed the slurry was poured into a number of cylindrical plastic molds, each mold being of inner diameter 5 cm and height 11 cm; then the molds were sealed with wax film and laid still at room temperature for setting and hardening. De-molding took place 7 days later. From the solidified bodies thus obtained 5 samples were selected, and their rough ends were sawed off so that they became standardized cylindrical specimens, 5 cm in diameter and 10 cm in length, suitable for ASTM testing. Compressive strength tests were performed with these five specimens following the test procedures of ASTM C39, and the average compressive strength of these five was calculated. One of the specimens was then broken up and smashed into small particles; and these particles were put through a sieve to collect the particles of diameters within the range from 1.18 mm to 4.75 mm for toxicity analysis (T.C.L.P). It may be well to mention that, by Taiwan EPA regulations, T.C.L.P particle size has to be below 9.5 mm in diameter. The foregoing procedures and tests had been run several times with different quantities of Portland type II cement and barium compounds. Results are listed in Table 8, where it is shown that a small amount of barium-compound additives can decrease T.C.L.P in a great measure; the more the additives, the lower the toxicity; thus proving barium compounds can effectively stabilize chromate ions within solidified bodies.

TABLE 8

Result of Experiment on Barium Silicate and Barium Hydroxide Increasing Effectiveness in the Solidification of Chromium (VI) Containing Waste Liquor

| | | | Solidification Proportion (%) | | | Solidified Product Quality | |
|---|---|---|---|---|---|---|---|
| | $Cr^{+6}$ containing soln. | | Solidifier | | | | 7 days curing |
| | $Cr^{+6}$] | | Portland | Ba Compound | | T.C.L.P | compressive |
| Expt. No. | Conc. ppm | Wt. | Type II Cement | Barium Silicate | Barium Hydroxide | $Cr^{+6}$ dissolving out Concentration | strength $(kg/cm^2)$ |
| 1 | 7000 | 30 | 70 | 0 | 0 | 4.02 | 223 |
| 2 | 7000 | 30 | 69.3 | 0.7 | 0 | 2.58 | 192 |
| 3 | 7000 | 30 | 68.6 | 1.4 | 0 | 1.60 | 235 |
| 4 | 7000 | 30 | 67.2 | 2.8 | 0 | 0.27 | 181 |
| 5 | 7000 | 30 | 65.8 | 4.2 | 0 | 0.10 | 205 |
| 6 | 7000 | 30 | 68.85 | 0 | 1.15 | 1.48 | 205 |
| 7 | 7000 | 30 | 67.70 | 0 | 2.30 | 0.43 | 170 |
| 8 | 7000 | 30 | 66.55 | 0 | 3.45 | 0.16 | 177 |

EXAMPLE 9

An industrial mud-waste containing hexavalent chromium (VI) ($Cr^{+6}$) was obtained from a certain factory. By chemical analysis it was found that the mud-waste consisted of 40% water and 13.7% $Cr^{+6}$ by weight. The mud-waste was then mixed with Portland type II cement, hydrated barium chloride ($BaCl_2.2H_2O$) and water in various proportions as shown in Table 9. Each slurry so obtained was poured into a number of cylindrical polyethylene molds of the type specified in Example 8; and the molds having been sealed off were laid still in room temperature over a period of 14 days for proper setting and hardening of the slurry within. After de-molding, specimen preparation, compressive strength test, and T.C.L.P test followed the methods of the previous example. Results are given in Table 9, where it is shown that the more the $BaCl_2.2H_2O$ addition, the less was the $Cr^{+6}$ T.C.L.P concentration. When to every 100 parts by weight of mud waste was added 4 parts by weight of barium chloride ($BaCl_2.2H_2O$), the dissolving out concentration of hexavalent chromium ions could be lowered to below 2 ppm.

TABLE 9

Result of experiment on barium chloride increasing effectiveness in the solidification of chromium (VI) containing waste liquor.

| Ser. No. | $Cr^{+6}$ containing mud-waste (Part by Wt.) | Portland Type II Cement (Part by Wt.) | Barium Chloride ($BaCl_2 2H_2O$) (Part by Wt.) | Water (Part by Wt.) | T.C.L.P. $Cr^{+6}$ dissolving Out conc. (ppm) | 14 days Curing Compressive Strength $(kg/cm^2)$ |
|---|---|---|---|---|---|---|
| 1 | 100 | 100 | 0 | 50 | 3.04 | 223 |
| 2 | 100 | 98 | 2 | 50 | 2.76 | 235 |
| 3 | 100 | 96 | 4 | 50 | 1.76 | 181 |
| 4 | 100 | 94 | 6 | 50 | 0.94 | 205 |

While the invention has been substantially described and particularly shown with reference to the foregoing examples, it will occur to those who are skilled in the art that modifications, variations, and other changes are possible in light of the above teaching, without departing from the spirit and scope of the invention in its broader aspects; therefore, it is to be understood that, within the scope of the appended claims, the invention may be practiced otherwise than as specifically described.

What is claimed is:

1. A method for removing at least one of chromate or other oxy-metal ions from liquid solutions, comprising:

contacting the liquid solution with solid barium compounds selected from the group consisting of barium silicate and barium fluosilicate as adsorbents so that the at least one of chromate or other oxy-metal ions in liquid solution are subject to an exchange reaction with an anion of the solid barium compounds to produce products including at least one of solid barium chromate or oxy-metal barium compounds and are removed from the liquid solution.

2. The method as claimed in claim 1, wherein the oxy-metal ions are bivalent or of higher valence.

3. The method as claimed in claim 1, wherein the oxy-metal ions are molybdate ions, wolframate ions or vanadate ions.

4. The method as claimed in claim 1, wherein the barium compounds are separated from the liquid solution and are next subject to the desorption of at least one of chromate or oxy-metal ions with a desorption agent solution and the solid barium compounds acting as adsorbent are regenerated.

5. The method as claimed in claim 4, wherein the desorption agent is at least one of sodium carbonate, sodium sulphate, sodium sulphite or hydrochloric acid.

6. The method as claimed in claim 1, wherein the solution is adjusted to have a pH value of 6.0 and above.

7. A method for stabilizing at least one of chromate or other oxy-metal ions that are present in liquid or sludge wastes, comprising:

mixing the liquid or sludge wastes with a portland cement as a solidification agent, and barium compounds in solid form selected from the group consisting of barium silicate and barium fluosilicate, so that the at least one of chromate or oxy-metal ions are immobilized in a solidified body.

8. The method as claimed in claim 7, wherein the oxy-metal ions are bivalent or of higher valence.

9. The method as claimed in claim 7, wherein the oxy-metal ions are molybate ions, wolframate ions or vanadate ions.

10. The method as claimed in claim 7, wherein the liquid or sludge wastes is adjusted to have a pH value of 6.0 and above.

* * * * *